United States Patent
Bevington et al.

(10) Patent No.: US 7,891,941 B2
(45) Date of Patent: Feb. 22, 2011

(54) WIND TURBINE HAVING A DIRECT-DRIVE DRIVETRAIN

(75) Inventors: Christopher M. Bevington, Waitsfield, VT (US); Garrett L. Bywaters, Waitsfield, VT (US); Clint C. Coleman, Warren, VT (US); Daniel P. Costin, Chelsea, VT (US); William L. Danforth, Rochester, VT (US); Jonathan A. Lynch, St. Johnsbury, VT (US); Robert H. Rolland, Waitsfield, VT (US)

(73) Assignee: Northern Power Systems, Inc., Barre, VT (US)

( * ) Notice: Subject to any disclaimer, the term of this patent is extended or adjusted under 35 U.S.C. 154(b) by 12 days.

(21) Appl. No.: 12/246,713

(22) Filed: Oct. 7, 2008

(65) Prior Publication Data

US 2009/0026771 A1    Jan. 29, 2009

Related U.S. Application Data

(63) Continuation of application No. 10/858,551, filed on Jun. 1, 2004, now Pat. No. 7,431,567.

(60) Provisional application No. 60/474,657, filed on May 30, 2003.

(51) Int. Cl.
*F03D 11/00* (2006.01)
(52) U.S. Cl. .................................................. 415/123
(58) Field of Classification Search ............... 415/123; 290/44, 55
See application file for complete search history.

(56) References Cited

U.S. PATENT DOCUMENTS

| 2,153,523 | A | | 4/1939 | Edmonds et al. |
| 4,260,325 | A | * | 4/1981 | Cymara ...................... 415/4.4 |

(Continued)

FOREIGN PATENT DOCUMENTS

BE           902092        7/1985

(Continued)

OTHER PUBLICATIONS

Restriction Requirement dated Sep. 25, 2006, in related U.S. Appl. No. 10/858,551.

(Continued)

*Primary Examiner*—Ninh H Nguyen
(74) *Attorney, Agent, or Firm*—Downs Rachlin Martin PLLC

(57) ABSTRACT

A wind turbine comprising an electrical generator that includes a rotor assembly. A wind rotor that includes a wind rotor hub is directly coupled to the rotor assembly via a simplified connection. The wind rotor and generator rotor assembly are rotatably mounted on a central spindle via a bearing assembly. The wind rotor hub includes an opening having a diameter larger than the outside diameter of the central spindle adjacent the bearing assembly so as to allow access to the bearing assembly from a cavity inside the wind rotor hub. The spindle is attached to a turret supported by a tower. Each of the spindle, turret and tower has an interior cavity that permits personnel to traverse therethrough to the cavity of the wind rotor hub. The wind turbine further includes a frictional braking system for slowing, stopping or keeping stopped the rotation of the wind rotor and rotor assembly.

17 Claims, 8 Drawing Sheets

U.S. PATENT DOCUMENTS

| | | | |
|---|---|---|---|
| 4,291,233 | A | 9/1981 | Kirschbaum |
| 4,316,699 | A | 2/1982 | Schott et al. |
| 4,357,542 | A | 11/1982 | Kirschbaum |
| 4,551,631 | A * | 11/1985 | Trigilio ............... 290/55 |
| 5,281,094 | A | 1/1994 | McCarty et al. |
| 5,289,041 | A | 2/1994 | Holley |
| 5,506,453 | A * | 4/1996 | McCombs ............. 290/44 |
| 5,990,568 | A | 11/1999 | Hildingsson et al. |
| 6,285,090 | B1 | 9/2001 | Brutsaert et al. |
| 6,400,039 | B1 | 6/2002 | Wobben |
| 6,452,287 | B1 * | 9/2002 | Looker ............... 290/55 |
| 6,483,199 | B2 | 11/2002 | Umemoto et al. |
| 6,504,260 | B1 | 1/2003 | Debleser |
| 6,541,877 | B2 | 4/2003 | Kim et al. |
| 6,759,758 | B2 | 7/2004 | Torres Martinez |
| 6,841,892 | B1 * | 1/2005 | Le Nabour et al. ........ 290/43 |
| 6,870,281 | B2 | 3/2005 | Weitkamp |
| 6,872,049 | B2 | 3/2005 | Christensen |
| 6,888,262 | B2 | 5/2005 | Blakemore |
| 6,921,243 | B2 | 7/2005 | Canini et al. |
| 6,945,752 | B1 | 9/2005 | Wobben |
| 6,998,729 | B1 | 2/2006 | Wobben |
| 7,042,109 | B2 | 5/2006 | Gabrys |
| 7,057,305 | B2 | 6/2006 | Kruger-Gotzmann et al. |
| 7,075,192 | B2 | 7/2006 | Bywaters et al. |
| 7,109,600 | B1 | 9/2006 | Bywaters et al. |
| 7,119,453 | B2 | 10/2006 | Bywaters et al. |
| 7,154,193 | B2 | 12/2006 | Jansen et al. |
| 7,183,665 | B2 | 2/2007 | Bywaters et al. |
| 7,431,567 | B1 | 10/2008 | Bevington et al. |
| 2003/0011198 | A1 | 1/2003 | Eccles et al. |
| 2003/0071469 | A1 | 4/2003 | Becker |
| 2003/0194310 | A1 * | 10/2003 | Canini et al. ............. 415/4.2 |
| 2004/0041409 | A1 | 3/2004 | Gabrys |
| 2004/0075279 | A1 * | 4/2004 | Breth et al. ............. 290/55 |
| 2004/0232704 | A1 * | 11/2004 | Casazza et al. ........... 290/55 |
| 2006/0071575 | A1 | 4/2006 | Jansen et al. |

FOREIGN PATENT DOCUMENTS

| | | |
|---|---|---|
| DE | 261395 A1 | 10/1988 |
| DE | 4402184 A1 | 8/1995 |
| DE | 10102255 A1 | 8/2001 |
| EP | 0037002 A1 | 3/1980 |
| EP | EP0811764 A1 | 12/1997 |
| EP | 0811764 B1 | 5/2000 |
| EP | 1371845 A2 | 12/2003 |
| ES | 2156706 A1 | 1/2001 |
| WO | 0070219 | 11/2000 |
| WO | 0121956 A1 | 3/2001 |
| WO | WO0121956 A1 | 3/2001 |
| WO | WO0205408 A1 | 1/2002 |
| WO | 02057624 | 7/2002 |
| WO | WO02057624 A1 | 7/2002 |
| WO | WO02/090769 A1 | 11/2002 |
| WO | 03023943 A | 3/2003 |

OTHER PUBLICATIONS

Response to Restriction Requirement dated 10110/2006, in related U.S. Appl. No. 10/858,551.
Second Restriction Requirement dated Jan. 19, 2007, in related U.S. Appl. No. 10/858,551.
Response to Second Restriction Requirement dated Jan. 26, 2007, in related U.S. Appl. No. 10/858,551.
Restriction Requirement dated May 22, 2009, in related U.S. Appl. No. 12/246,713.
Response to Restriction Requirement dated Jun. 22, 2009, in related U.S. Appl. No. 12/246,713.
International Search Report and Written Opinion dated Jul. 27, 2005, regarding related PCT Application Serial No. PCT/ISA/206.
Chen et al, "A Variable-Speed, Permanent-Magnet, Wind-Turbine Generator and its Control", Power Engineering Conference vol. 2, Sep. 1995 pp. 517-520.
Jefferson et al, "The Application of Flywheels in Short-Term Energy Storage", Alternative Energy Systems, Electrical Integration and Utilization Conference, Sep. 1984, pp. 97-104.
International Search Report and Written Opinion dated Sep. 21, 2005, regarding related PCT Application Serial No. PCT/ US2005/ 013316.
Notice of Allowance dated Feb. 21, 2006, in related U.S. Appl. No. 10/709,176.
Office Action dated Nov. 10, 2005, in related U.S. Appl. No. 10/709,176.
Response to Office Action dated Feb. 1, 2006, in related U.S. Appl. No. 10/709,176.
Notice of Allowance dated Sep. 29, 2006, in related U.S. Appl. No. 11/276,912.
Notice of Allowance dated Aug. 3, 2006, in related U.S. Appl. No. 11/419,299.
Notice of Allowance dated Jul. 18, 2006, in related U.S. Appl. No. 11/276,869.
Office Action dated May 25, 2006, in related U.S. Appl. No. 11/276,912.
Response to Office Action dated Aug. 28, 2006, in related U.S. Appl. No. 11/276,912.
Office Action dated Apr. 19, 2007, in related U.S. Appl. No. 10/858,551.
Response to Office Action dated Aug. 20, 2007, in related U.S. Appl. No. 10/858,551.
Notice of Allowance dated May 23, 2008, in related U.S. Appl. No. 10/858,551.
Office Action dated April 19, 2007 with regard to related U.S. Appl. No. 10/858,551.
Response to Office Action dated Aug. 20, 2007 with regard to related U.S. Appl. No. 10/858,551.
Notice of Allowance dated May 23, 2007 with regard to related U.S. Appl. No. 10/858,551.

* cited by examiner

WIND TURBINE HAVING A DIRECT-DRIVE DRIVETRAIN

RELATED APPLICATION DATA

This application is a continuation of U.S. patent application Ser. No. 10/858,551, filed Jun. 1, 2004, and titled "Wind Turbine Having a Direct-Drive Drivetrain" (now U.S. Pat. No. 7,431,567, issued Oct. 7, 2008), which is incorporated by reference herein in its entirety. This application also claims the benefit of priority of U.S. Provisional Patent Application Ser. No. 60/474,657, filed May 30, 2003, and titled "Direct Drive Configuration for a Wind Turbine Generator," which is also incorporated by reference herein in its entirety.

GOVERNMENT LICENSE RIGHTS

The U.S. Government has a paid-up license in this invention and the right in limited circumstances to require the patent owner to license others on reasonable terms as provided for by the terms of Subcontract YCX-1-30209-02 awarded by the National Renewable Energy Laboratory.

FIELD OF THE INVENTION

The present invention generally relates to the field of wind turbines. In particular, the present invention is directed to a wind turbine having a direct-drive drivetrain.

BACKGROUND OF THE INVENTION

The use of wind turbines to harness wind energy in order to generate electrical power has a number of benefits, including "greenness," i.e., wind turbines generally do not pollute the environment during normal operation, and the ability to provide electrical power to remote locations not having practical access to a wide-area power distribution network, among others. The most basic parts of a wind turbine are an electrical generator and a wind rotor (as distinguished from a generator rotor) that drives the generator as a result of a wind's effects on the wind rotor. As used herein, the term "wind rotor" denotes the assembly that comprises a blade hub and a plurality of blades (airfoils). Generally, the wind rotor converts wind energy into the rotational energy that drives the generator. Most early wind turbines included a gearbox connected between the wind rotor and generator so as to drive the generator at a different rotational speed than the rotational speed of the wind rotor.

Although gear-driven wind turbines are still being made and used, direct-drive wind turbines are becoming more prevalent largely due to advances in systems for controlling this type of wind turbine. As its name implies, direct-drive wind turbines do not include a gearbox, but rather have a direct mechanical coupling between the wind rotor and generator so that the wind drives the wind rotor and the rotor within the generator together as a unit. Direct-drive wind turbines are typically heavier than gear-driven wind turbines of comparable power output largely due to force transfer issues arising from directly coupling the wind rotor to the generator. Although direct-drive wind turbines are typically heavier than their gear-driven counterparts, direct-drive wind turbines have an important advantage in that their complexity is less than the complexity of their gear-driven counterparts. Direct-drive wind turbines simply have fewer moving parts. This lower complexity typically results in direct-drive wind turbines being more reliable than their gear-driven counterparts. Reliability is an important consideration for wind turbines, particularly wind-turbines used in remote locations that rely heavily on only one or a few wind turbines to provide the needed electrical power.

One important consideration in designing wind turbines of all types is to provide a robust structure while at the same time minimizing complexity, weight and amount of material needed to fabricate the wind turbines. Other important design considerations are maximization of accessibility to personnel for periodic inspection and/or maintenance and provision of a reliable and effective braking system for slowing, stopping and/or keeping stopped the wind rotor and generator periodically, e.g., to avoid damage due to overspeed, for maintenance and for other reasons.

A variety of conventional configurations exist for direct-drive wind turbines. Several of these configurations are described below for the purpose of illustrating conventional design approaches and shortcomings of these approaches in the context of the design considerations discussed immediately above.

World Intellectual Property Organization (WIPO) Publication No. WO 02/057624 to Wobben discloses a single-bearing, direct-drive, horizontal-axis wind turbine, which is indicated in FIG. 1 by the numeral 10. Generally, wind turbine 10 includes a wind rotor 12 and a generator 14 supported by a turret 16. Turret 16 is connected to a two-piece hollow spindle 18 consisting of parts 20, 22. Generator 14 includes a rotor assembly 24 and a stator assembly 26. Spindle 18 supports a plurality of radial support arms 28, which support stator assembly 26 of generator 14. Spindle 18 also supports a single bearing 30 that supports wind rotor 12 and rotor assembly 24. Wind rotor 12 is spaced from bearing 30 via an intermediate connecting shaft 32 that tapers inward toward the rotational axis of wind rotor 12 and rotor assembly 24 from bearing 30 to wind rotor, making access to the bearing difficult, if not impossible. In order for personnel to access bearing 30, wind rotor 12 and rotor assembly 24 would have to be removed. Thus, an inspection of bearing 30 that could otherwise be a relatively simple task, would require a crane, helicopter or other hoisting means and a great deal of effort. In addition, the active length of generator 14 is relatively small compared to its diameter. This is very efficient from an electrical standpoint, but inefficient structurally. This design requires relatively large and stiff radial support arms 28 to maintain the position of stator assembly 26. The design would be less expensive with a smaller diameter and longer active length, due to the decreased weight of radial support arms 28. Wobben is completely silent on any sort of frictional braking system for rotor assembly 24.

WIPO Publication No. WO 01/21956 to Lagerwey discloses another single-bearing, direct-drive, horizontal-axis wind turbine, which is indicated in FIG. 2 by the numeral 40. Wind turbine 40 comprises a wind rotor 42 and a generator 44 that includes a stator assembly 46 and rotor assembly 48 generally located radially outward from the stator assembly. A turret 50 supports a single-piece hollow spindle 52, which supports stator assembly 46. Spindle 52 also supports a single bearing 54 that supports wind rotor 42 and rotor assembly 48. Spindle 52 tapers to a smaller diameter from turret 50 to bearing 54. This configuration helps to carry the increased bending load in spindle 52 near turret 50. It also decreases the radial distance from spindle 52 to stator assembly 46, which decreases the weight and increases the stiffness of the support provided to the stator assembly. Rotor assembly 48 includes a rotor support 56 attached to bearing 54 and wind rotor 42. A shortcoming of this configuration relates to the stiffness of rotor support 56. In order to provide sufficiently stiff support, rotor support 56 would need to be relatively thick so as to keep the generator rotor precisely positioned relative to stator assembly 46. However, making rotor support 56 relatively thick is uneconomical. On the other hand, if rotor support 56 is too flexible, catastrophic rubbing between the rotor assembly 48 and stator assembly 46 will result.

FIG. 3 shows an alternative configuration for supporting the parts of generator 44 in FIG. 2. In this alternative configuration rotor assembly 48' is generally located radially inward of stator assembly 46'. Stator assembly 46' includes a stator support 60. Similar to rotor support 56 of FIG. 2, shortcomings of stator support 60 lie in its wall-type design. If stator support 60 is too thin, it will be unsuitable for precise control of stator assembly 46' and catastrophic rubbing would likely result. On the other hand, if stator support 60 is thicker so as to provide adequate stiffness, the thickness results in economical inefficiency. Also, bearing 54' is located axially forward of the rotor assembly 48'. This arrangement wastes axial space. In addition, this design of FIG. 3 uses air-cooled fins 62 in combination with direct cooling of the active portion of stator assembly 46' using liquid cooling tubes (not shown). This is a relatively expensive and inefficient combination. Air cooling is passive and does not keep the temperature within set boundaries. Cooling tubes are inserted into holes in stator assembly 46' and do not have sufficient direct contact with the active portion of the stator assembly needed for efficient heat transfer. Also, rotor assembly 48' and wind rotor 42 are both connected into the outer race 64 of the bearing 54'. This requires outer race 64 to be drilled and likely threaded, which is a very expensive operation on a hardened bearing of this size. The seals of the bearing are not shown, but presumably the downwind seal is difficult to reach, since this seal would be nearly entirely enclosed by stator support 60. Only a small gap exists between rotor assembly 48' and spindle 52'. Like Wobben, Lagerwey is completely silent on a frictional braking system for generator rotor 48'.

U.S. Pat. No. 6,452,287 to Looker discloses a ducted horizontal-axis, direct-drive wind turbine having a single-bearing. The Looker wind turbine has an integral wind rotor hub and generator rotor. The design has an impractical construction, however, for large wind turbines. The sections shown would be massive, expensive and difficult to lift for a large wind turbine. A more efficient structure is needed. In addition, no means is shown for practically connecting the bearing to the rotor and stator in such a way as to safely transmit the loads from the variations of the wind. Maintenance, moisture control and a braking system for the device are subjects clearly beyond the scope of the Looker disclosure.

SUMMARY OF THE INVENTION

In one implementation, the present disclosure is directed to a wind turbine/generator set. The wind turbine/generator set includes: a) a generator that includes a stator assembly and a rotor assembly rotatable about a rotational axis, the rotor assembly including an active portion and an active portion support supporting the active portion; b) a wind rotor coupled to the rotor assembly; c) a generator support fixedly supporting the stator assembly and rotatably supporting the rotor assembly; and d) at least one braking device fixed relative to the generator support and including at least one frictional member operatively configured for frictionally engaging at least a portion of the active portion support.

In another implementation, the present disclosure is directed to a wind turbine/generator set. The wind turbine/generator set includes: a) a wind rotor rotatable about a rotational axis; b) a generator operatively connected to the wind turbine and including an active stator portion and an active rotor portion spaced from the active stator portion; c) a stator support frame supporting the active stator portion; and d) a cooling jacket located between the stator support frame and the active stator portion, the cooling jacket comprising tubing wound into a helical configuration.

In another implementation, the present disclosure is directed to a method of making a wind turbine generator. The method includes the steps of: a) positioning a stator assembly relative to a spindle having a first surface, the stator assembly having a reference datum; and b) following step a), truing at least a portion of the first surface relative to the reference datum so as to create a trued surface.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 1:
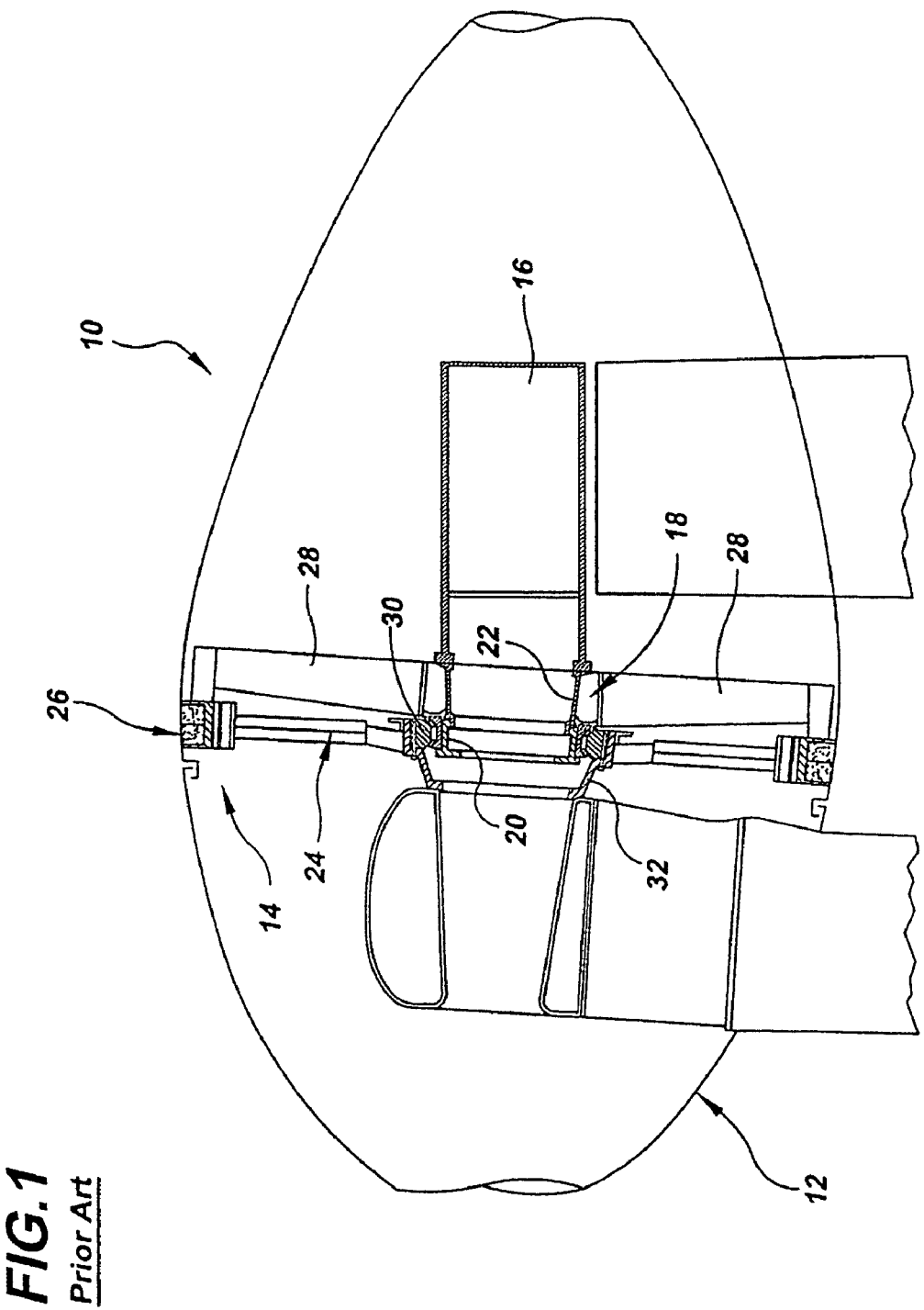
FIG. 1 is a cross-sectional elevational view of a prior art wind turbine.
Figure 2:
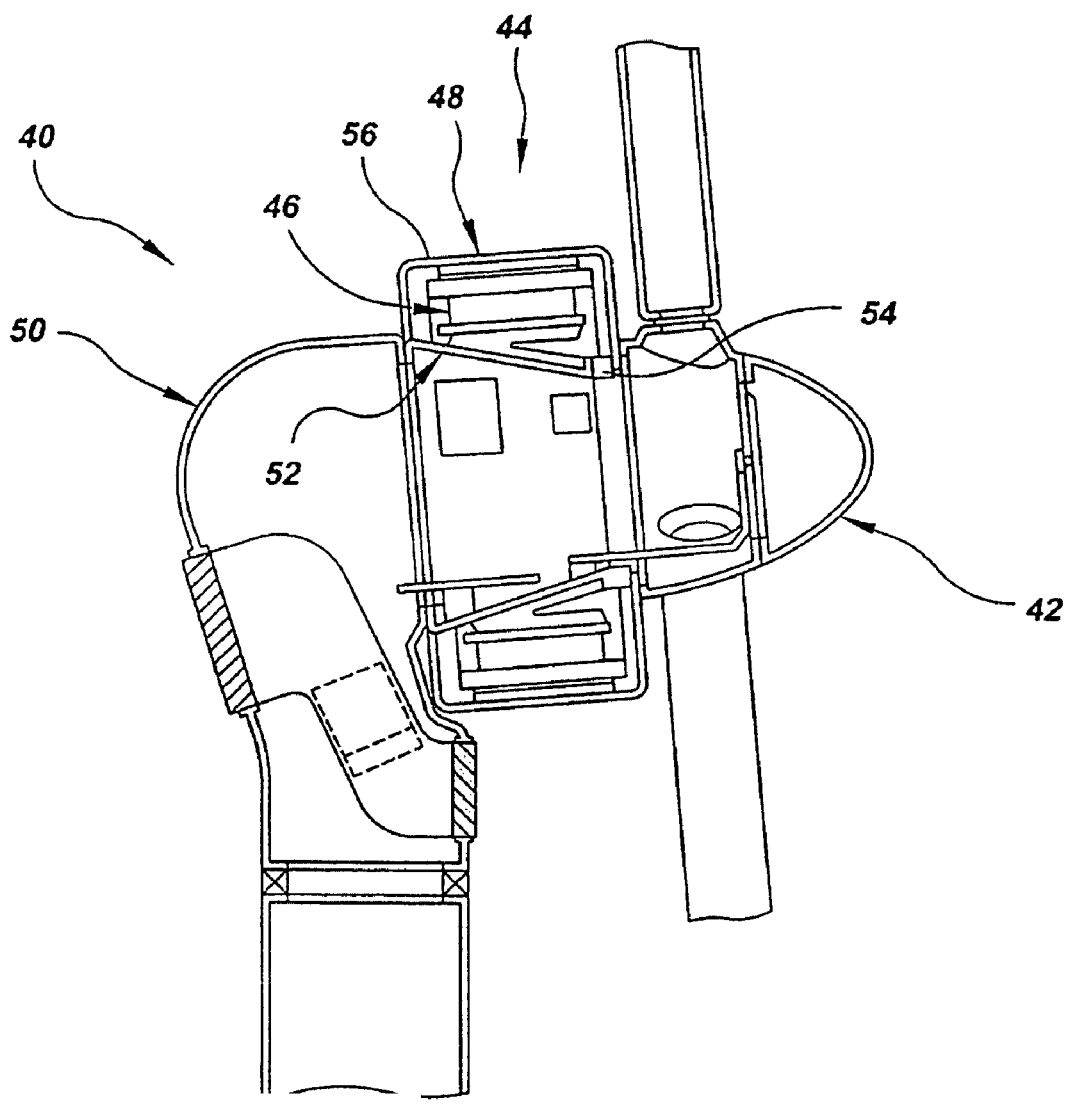
FIG. 2 is a cross-sectional elevational view of another prior art wind turbine.
Figure 3:
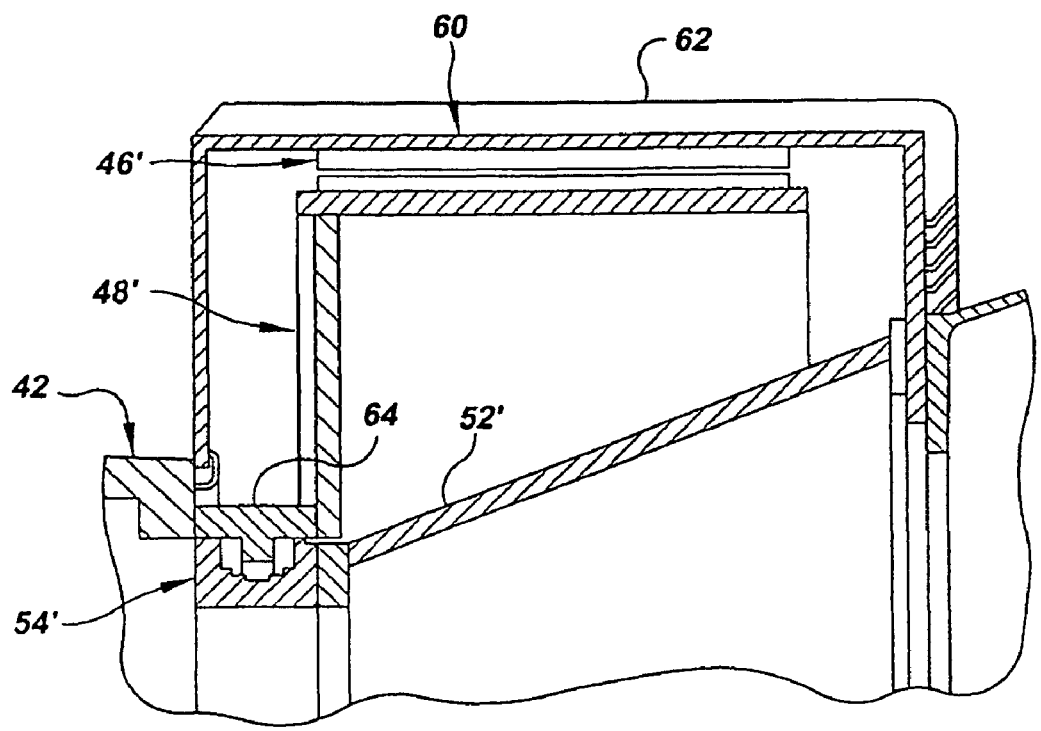
FIG. 3 is an enlarged cross-sectional view of a prior art alternative generator configuration of the wind turbine of FIG. 2.
Figure 4:
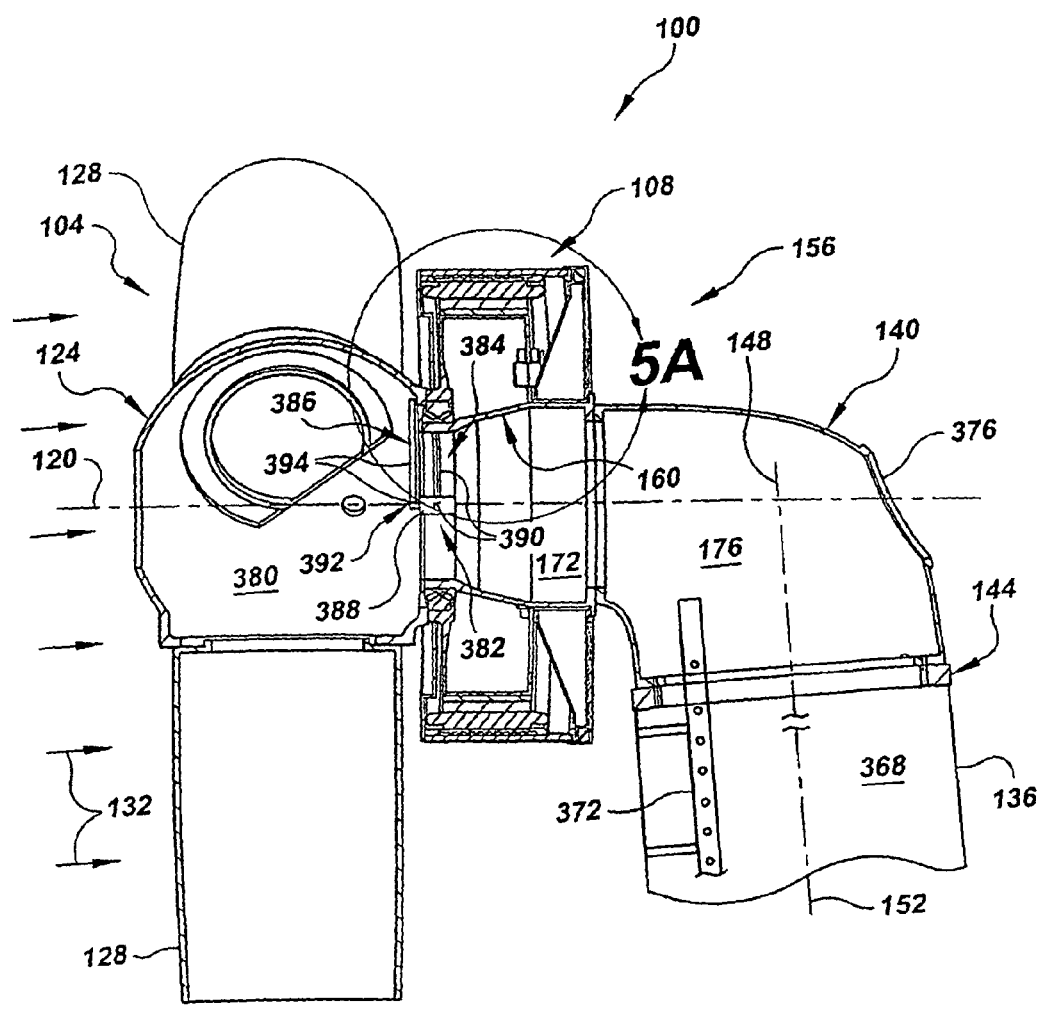
FIG. 4 is cross-sectional elevational view of a wind turbine of the present invention.
Figure 5A:
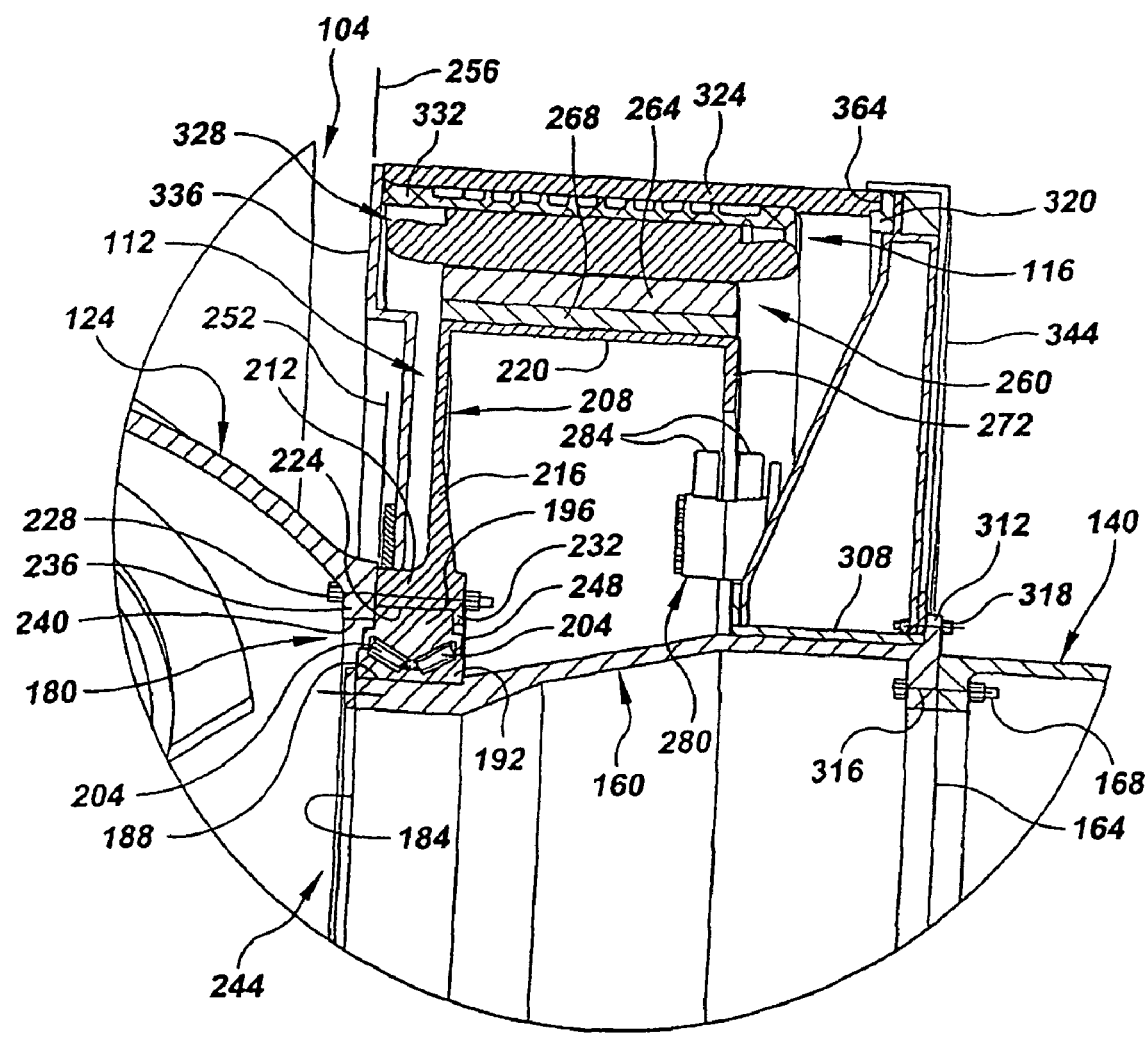
FIG. 5A is an enlarged partial cross-sectional view of the wind turbine of FIG. 4.
Figure 6:
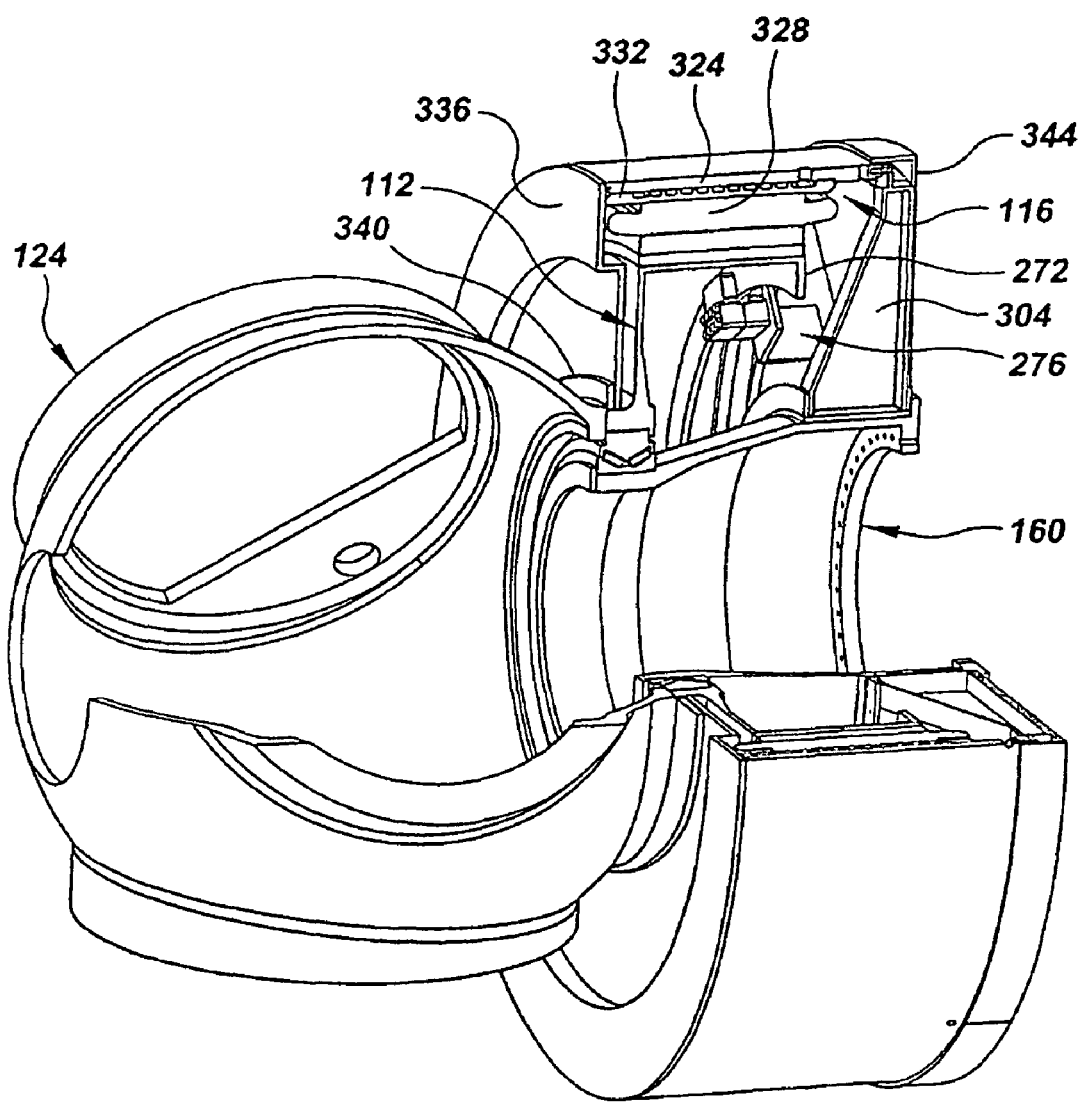
FIG. 6 is a partial perspective, partial sectional view of the wind turbine of FIG. 4.

Referring again to the drawings, FIGS. 4, 5A and 6 show in accordance with the present invention a direct-drive wind turbine/generator set, which is indicated generally by the numeral 100. Wind turbine/generator set 100 generally comprises a wind turbine 104 and an electrical generator 108. For convenience, wind turbine/generator set 100 will be referred to herein as simply "wind turbine," since wind-turbine/generator sets are often colloquially referred to in this manner. In order to distinguish between "wind turbine" 100 and wind turbine 104, wind turbine 104 is referred to hereinafter and in the appended claims as "wind rotor 104" or "wind rotor." As discussed below in detail, wind turbine 100 includes a number of features that provide improvements over conventional direct-drive wind turbines, e.g., the wind turbines discussed above in the background section. These improvements generally relate to ease of inspection/maintenance, ease of fabrication, economical cost and efficiency of operation and design, among other things.

Electrical generator 108 generally comprises a rotor assembly 112 and a stator assembly 116. Since wind turbine 100 is of the direct-drive type, as discussed above in the background section, wind rotor 104 is connected to rotor assembly 112 such that the wind rotor and the rotor assembly rotate in a unitary fashion about a common rotational axis 120. Details regarding the connection between wind rotor 104 and rotor assembly 112 are discussed below. Wind rotor 104 may include a hub 124 and a plurality of airfoils, e.g., blades 128 extending generally radially outward from rotational axis 120. Wind rotor 104 may include any number of blades 128 desired to suit a particular design. Two and three bladed wind rotors are presently most common, but another number of blades 128 and/or another type of airfoil may be used. Designing, and selecting of the number, of blades 128 are well known in the art such that a detailed description is not necessary herein for those skilled in the art to appreciate how to make and use the present invention. During operation of wind turbine 100, wind rotor 104 is driven by wind 132 to rotate and supply a useful torque and other non-useful forces and bending moments through wind rotor hub 124 to generator 108.

As with most wind turbines, wind turbine 100 may be spaced from the ground or a supporting structure (not shown) by a tower 136 having a suitable height for the intended application. Considerations in selecting the height of tower 136 include, among other things, the distance from the tips of blades 128 to rotational axis 120 and the proximity and characteristics of surrounding structures, geographic features or the like that may affect wind 132 impinging upon wind rotor 104. Principles for designing tower 136 as a structural member are well known in the art and need not be addressed herein in any detail for those skilled in the art to appreciate the broad scope of the present invention.

Wind turbine 100 may be supported by tower 136 via a turret 140 that may be rotatably attached to the tower by a yaw bearing assembly 144 that allows the turret and wind turbine to pivot about a rotational axis 148 that may be collinear with the longitudinal axis 152 of the tower. The combination of wind rotor hub 124, generator 108 and turret 140 may be referred to as a "drive train" 156. Drive train 156 may by positioned about rotational axis 148 in the direction of wind 132 by any pivoting means (not shown), e.g., such as an electric motor and gear system. Drive train 156 may be surrounded by a protective enclosure (not shown), such as a fiberglass or sheet metal nose cone and nacelle, so as to protect the drive train from weather and provide a platform for auxiliary equipment (not shown) and maintenance and/or inspection personnel (not shown). If provided, the nose cone may be secured to wind rotor hub 124 and/or one or more of blades 128, and the nacelle may be secured to generator 108, turret 140 and/or yaw bearing assembly 144.

Generator 108 and wind rotor 104 may be supported by a spindle 160, which may be fixedly attached to turret 140 at a first end 164, e.g., by mechanical fasteners, such as bolts 168, or other fastening methods, such as welding. For reasons discussed below, spindle 160 and turret 140 are preferably relatively thin-walled structures that provide these members with substantially unobstructed corresponding respective interior cavities 172, 176. Spindle 160 may be partly tapered as shown or, alternatively, may be fully tapered or not tapered at all. Fully tapered designs can be very structurally efficient, but can unduly complicate connections between spindle 160 and other parts of wind turbine 100. Non-tapered designs tend to not be as structurally efficient as tapered designs, but may be more cost efficient to fabricate. In any event, a designer having ordinary skill in the art will be able to select a suitable design for spindle 160.

A bearing assembly 180 may be provided adjacent a second end 184 of spindle 160 for rotatably supporting generator rotor assembly 112 and wind rotor 104. Bearing assembly 180 may engage a bearing mounting surface 188 of spindle 160 and may include an inner bearing ring 192 fixed relative to the spindle and an outer bearing ring 196 fixed relative to rotor assembly 112. Inner and outer bearing rings 192, 196 may contain a plurality of roller bearings, such as the tapered bearings 204 shown. "Double-row" roller bearing assembly 180 shown is particularly suitable for handling moments about moment axes perpendicular to rotational axis 120, e.g., moments caused by non-uniform wind forces.

Generator rotor assembly 112 may comprise a rotor wheel 208 having a rotor hub 212 that engages outer bearing ring 196. Rotor wheel 208 may also include a radial portion 216 that is substantially radial to rotational axis 120 and an active rotor portion support 220 that may be substantially perpendicular to the radial portion. Rotor wheel 208 may be of any suitable design, such as continuous or segmented. In a continuous design, each of hub 212, radial portion 216 and active rotor portion support 220 are each non-segmented in a direction around rotational axis 120. In contrast, in a segmented design, one or more of hub 212, radial portion 216 and active rotor portion support 220 may be segmented in a direction around rotational axis 120. An example of a segmented design is one in which radial portion 216 comprises a plurality of spokes.

Rotor wheel hub 212 may include a channel or an edge rabbet 224 that receives a portion of outer bearing ring 196. Wind rotor hub 124 may be attached directly to rotor wheel hub 212 using any suitable fastening means, such as mechanical fasteners, e.g., bolts 228, or other means, such as welding or bonding. This direct attachment provides a very simple connection that reduces the number of parts in the connection and reduces the axial length of generator 108. When rotor wheel hub 212 is provided with edge rabbet 224 so as to define a first flange 232 extending inwardly toward rotational axis 120, wind rotor hub 124 may be configured to provide a portion 236 extending inwardly toward the rotational axis laterally adjacent outer bearing ring 196 that essentially functions as a second flange. When wind rotor hub 124 is attached to rotor wheel hub 212 as shown, portion 236 generally turns edge rabbet 224 into a channel in which outer bearing ring 196 is laterally captured. This arrangement simplifies installation of outer bearing ring 196 prior to attaching wind rotor hub 124 to rotor wheel 208 adjacent hub 212. Preferably, but not necessarily, the radially inner surface 240 of portion 236 that defines a downwind opening 244 in wind rotor hub 124 is spaced radially from inner bearing ring 192 of bearing assembly 180 sufficiently so as to provide access (at least visual, more preferably also physical) to the upwind side of the bearing assembly. Similarly, inner surface 248 of first flange 232 is preferably, but not necessarily, sufficiently spaced from inner bearing ring 192 so as to permit access to the other side of bearing assembly 180. Preferably, but not necessarily, inner surface 240 of portion 236 of wind rotor hub 124 is radially spaced 3 inches (7.62 cm) or more from bearing mounting surface 188 of spindle 160 relative to rotational axis 120. The plane 252 of the connection of wind rotor hub 124 to generator rotor hub 212 may be, but is not necessarily, located downwind of the plane 256 of the upwind face of generator 108.

Active rotor portion support 220 generally supports an active portion 260 of rotor assembly 112, i.e., the portion of the rotor assembly that is electrically and/or magnetically active for generating electrical energy when wind turbine 100 is operating. Active rotor portion 260 may comprise permanent magnets 264 and steel laminations (not shown). Alternatively, active rotor portion 260 may include coils of wire and steel laminations (not shown) in alternative types of electrical generators. Designs for active rotor portion 260 are well known in the art and need not be described in any further detail for those skilled in the art to appreciate the broad scope of the present invention.

Figure 7:
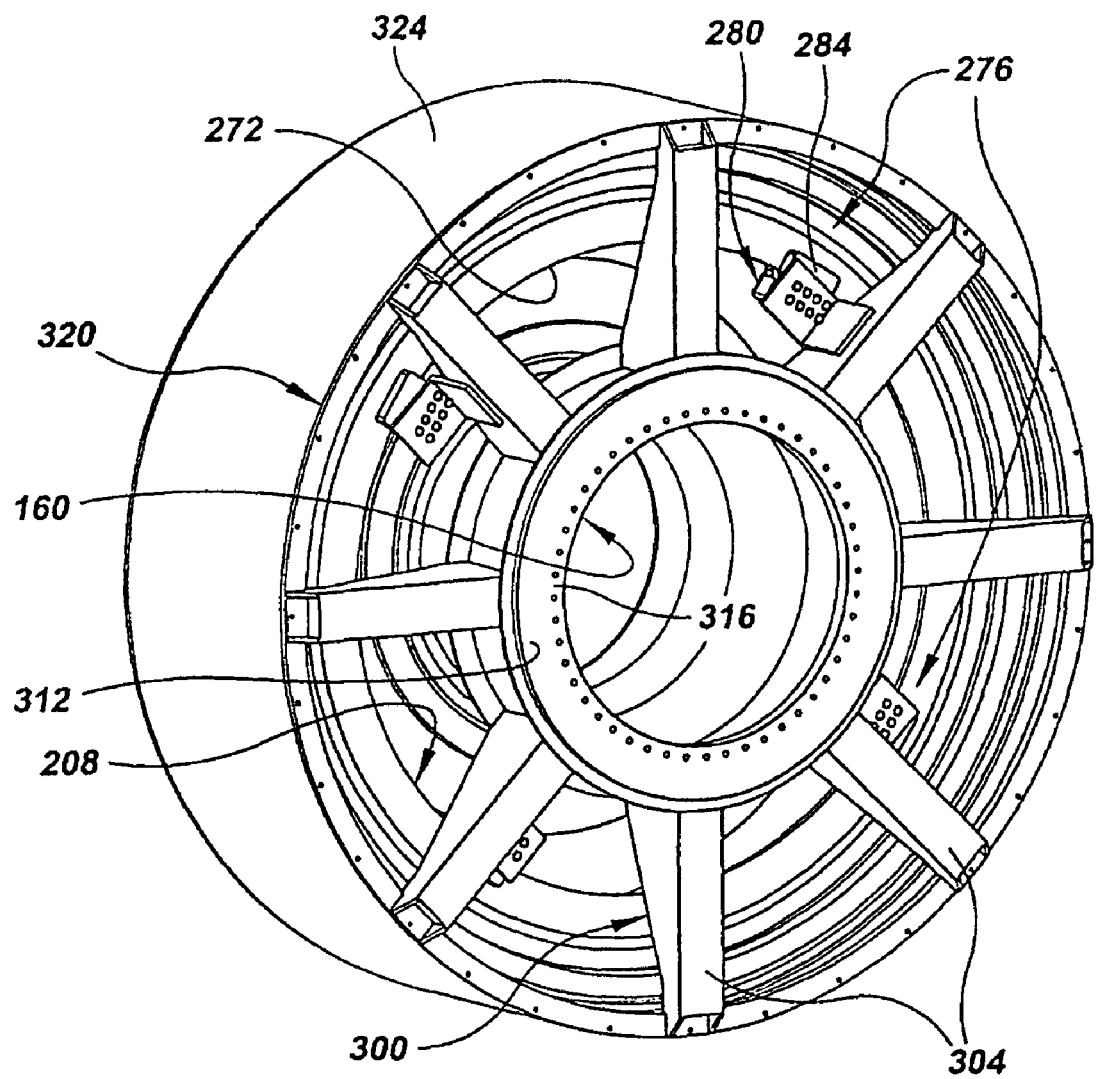
FIG. 7 is a perspective view of the generator portion of the wind turbine of FIG. 4, shown without the protective panels.

Rotor wheel 208 may be made of any suitable material, such as aluminum or steel. If steel is used and active rotor portion 260 comprises permanent magnets 264, a layer 268 of non-magnetic material, such as aluminum, will typically need to be located between wheel 208 and the permanent magnets so as to provide a magnetic barrier therebetween. Referring to FIG. 7, and also to FIGS. 5A and 6, rotor wheel 208 may optionally include a braking flange 272 extending radially inward from active rotor portion support 220 toward rotational axis 120. Braking flange 272 may be utilized in a braking system 276 for slowing, stopping and/or keeping stopped wind rotor 104 and generator rotor assembly 112 when desired. In addition to braking flange 272, braking system 276 may include one or more braking devices, such as the caliper-type devices 280 shown having a pair of opposing brake shoes 284. Braking devices 280 are well known in the art and do not require further elaboration herein for those skilled in the art to appreciate the scope of the present invention. Those skilled in the art will appreciate that caliper-type braking devices 280 may be used elsewhere relative to rotor wheel 208, such as on a horizontal, ring-shaped braking member (not shown) attached to radial portion 216 of the wheel. In this case, the brake shoes would have a curvature to account for the ring-shape of the braking member.

Figure 5B:
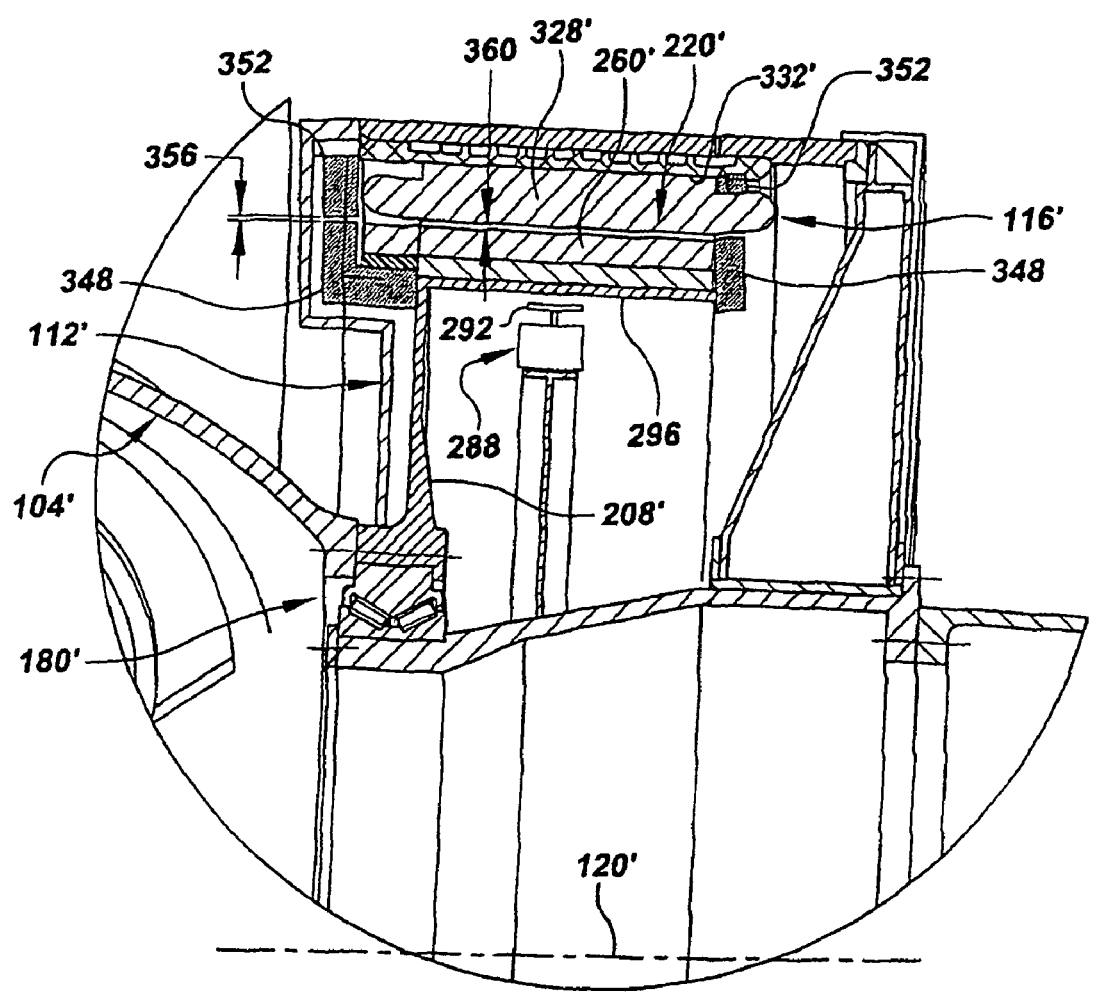
FIG. 5B is an enlarged partial cross-sectional view of an alternative wind turbine having a drum-type braking system in lieu of the caliper-type braking system of FIGS. 4, 5A, 6 and 7.

As shown in FIG. 5B, in alternative embodiments, caliper-type braking devices 280 of FIG. 5A need not be used. Consequently, braking flange 272 (FIG. 5A) need not be provided. However, braking flange 272 can be provided anyway to improve the stiffness of active rotor portion support 220. Other types of braking devices include drum-type devices 288, which may each include one or more brake shoes 292 that may be implemented so as to act against the inner surface 296 of active rotor portion support 220 to generate the required braking forces. In alternative embodiments, one or more drum-type braking members may be provided elsewhere, such as on radial portion 216 of rotor wheel 208.

Referring again to FIGS. 5A and 6, and also to FIG. 7, braking devices 280 may be connected to a stator assembly support structure, such as the "spider assembly" 300 shown. Of course, other types of stator assembly support structures may be used, such as a "continuous" support structure, which would have a similar configuration to a continuous design of rotor wheel 208 discussed above. As shown in FIGS. 5A and 6, spider assembly 300 may include one or more support arms 304 that are fixed relative to spindle 160, e.g., adjacent first end 164 of the spindle. Each support arm 304 may be attached, e.g., by welding or mechanical fastening means, directly to spindle 160 and/or to an inner support ring 308, which is in turn attached to the spindle via a suitable fastening means. Support arms 304 may be fabricated from members having various cross-sectional shapes, such as I-shapes, C-shapes and L-shapes, among others. In one embodiment, support arms 304 may taper from a location proximate spindle 160 to a location distal from the spindle. This is an efficient configuration in terms of structural design and weight. The number of support arms 304 provided may be any desired. However, a small number of support arms 304 may result in excessive deflection, but a large number of support arms may be costly. Presently, it is believed that the number of support arms should preferably be from 2 to 20, and more preferably from 4 to 8.

Spindle 160 may include first and second flanges 312, 316 adjacent its first end 164 for aiding in transmitting moments within each support arm 304 to turret 140. In this case, each support arm 304 may be attached to first flange 312, e.g., using bolts 318 or by welding. Support arms 304 may be attached at their radially outer ends to an outer support ring 320, which may support stator assembly 116. Stator assembly 116 may include an active stator portion support 324 that supports an active stator portion 328 and, optionally, a cooling jacket 332 in which a coolant (not shown) may be circulated for cooling generator 108. Active stator portion 328 may contain lamination of steel and coils of wire. Cooling jacket 332 may be made in any manner that provides at least one coolant passageway. For example, cooling jacket 332 may be made from rectangular tubing wound in a helical manner to a diameter that suits its engagement with active stator portion 328.

In order to protect active rotor and stator portions 260, 328 from moisture, dirt and other environmental elements, the upwind side of generator 108 may include a front closure 336 and seal 340 for sealing the gap between the front closure and rotor wheel 208 or wind rotor hub 124, depending upon the particular design. Front closure 336 may be attached to active stator portion support 324. Similarly, downwind side of generator 108 may be protected by a rear closure 344, which may comprise a plurality panels each extending between adjacent ones of support arms 304. Some or all of these panels may be removable so as to permit access to the interior of generator 108 and braking devices 280, if provided.

Active stator portion support 324 may be attached to outer ring 320 in any suitable manner, such as with mechanical fasteners or by welding, among others. Similarly, cooling jacket 332 may be attached to active stator portion support 324 in any suitable manner, again, such as with mechanical fasteners or by welding, among others. Spider assembly 300, active stator portion support 324 and cooling jacket 332 may be made of any suitable material, e.g., a metal such as aluminum, stainless steel or mild steel. Of course, the type of material used for these components may affect the choice of fastening means. For example, if active stator portion support 324 and cooling jacket 332 are each made of aluminum, it may be effective to join these two components by welding. However, if active stator portion support 324 is aluminum but outer support ring 320 is steel, mechanical fastening may be the preferred means. Those skilled in the art are knowledgeable about selecting suitable materials based on service conditions and selecting connection types based on the materials selected such that further details of these processes are not necessary for skilled artisans to appreciate the broad scope of the present invention.

Referring again to FIG. 5B, each of rotor assembly 112' and stator assembly 116' may be provided with one or more bearings, such as the frictional-type rotor bearings 348 and stator bearings 352 shown, for inhibiting contact between active rotor portion 260' and active stator portion 328' whenever bearing assembly 180' must resist a relatively large moment applied to wind rotor 104' in a direction perpendicular to rotational axis 120'. Such a large moment may be due to, e.g., non-uniform wind loads. Either rotor bearings 348 or stator bearings 352 or both should either be made of an electrically insulating material, e.g., polytetrafluoroethylene (PTFE). Alternatively, if rotor and stator bearings 348, 352 are conductive, either the rotor bearings or the stator bearings or both should be electrically insulated from the corresponding respective component(s) supporting them. Each stator bearing 352 may be attached to stator assembly 116' at any suitable location, such as on cooling jacket 332' and/or active stator portion 328'. Similarly, each rotor bearing 348 may be attached to rotor assembly 112' at any suitable location complementary to the locations of the corresponding stator bearings 352, such as on rotor wheel 208' or active rotor portion 260', among others. Complementary pairs of rotor and stator bearings 348, 352 may be spaced from one another by an air gap 356 that is less than the air gap 360 between active rotor and stator portions 260', 328' so that when these bearings contact each other, the active stator and rotor portions remain spaced from one another. Depending upon the configuration of rotor and stator assemblies 112', 116' and the placement of rotor and stator bearings 348, 352, these bearings may be any one of a variety of types, such as continuous ring, discontinuous ring and segmented, among others. Those skilled in the art will readily understand how to design rotor and stator bearings 348, 352 once the designs of rotor and stator assemblies 112', 116' are known.

In a presently preferred manufacturing process for fabricating wind turbine 100 of FIGS. 4, 5A, 6 and 7, spider assembly 300 consisting of support arms 304 and inner and outer support rings 308, 320 is made, e.g., by welding each support arm to each of the inner and outer support rings. Then, spider assembly 300 may be secured to spindle 160 by friction fit, e.g., shrink fit or press fit, and additionally or optionally fastened to the spindle, e.g., with mechanical fasteners and/or by welding. In one embodiment, mating surfaces of spindle 160 and inner support ring 308 may be machined prior to assembly so as to provide a precision fit. Once spider assembly 300 has been secured to spindle 160 and stator assembly has been precisely positioned relative to the spindle in its operative position, bearing mounting surface 188 of the spindle that engages bearing assembly 180 may be trued relative to the stator assembly, e.g., by machining. For example, stator assembly 116 may be precisely positioned relative to outer support ring 320, e.g., using two or more positioning dowels (not shown) inserted into precision-drilled holes in the stator assembly and outer support ring. A machining tool may then be used to true bearing mounting surface 188 relative to a reference datum on stator assembly 116, e.g., an inner surface of active stator portion 328. Using this method, concentricity errors between stator assembly 116 and rotor assembly 112 can be minimized.

Cooling jacket 332, active stator portion support 324 and active stator portion 328 may be press fit or shrink fit with one another so as to achieve good contact, especially between the cooling jacket and active stator portion. Such contact provides a good thermal path between active stator portion 328 and the coolant within cooling jacket 332 for cooling the active stator portion. Of course, there are many other ways of assembling wind turbine 100.

Referring to FIGS. 4 and 5A, as mentioned above it is preferred, though not essential, that turret 140 and spindle 160 each have a largely unobstructed interior cavity 176, 172. In this manner, provided wind turbine 100 is of sufficiently large physical size, internal cavities 172, 176 can readily be sized so as to allow at least an average-size adult human to traverse these cavities, e.g., by crawling or similar movement in a substantially prostrate position. It is likewise preferable, though not essential, that tower 136 have a largely unobstructed interior cavity 368. Thus, an inspector, or other person, could access cavities 176, 172 of turret 140 and spindle 160 from inside tower 136. A ladder 372, lift or other structure or device could be provided within cavity 368 of tower 136 to allow the person to access cavity 176 of turret 140 from below. Turret 140 may also be provided with an access hatch 376 that allows a person to access locations outside of cavities 176, 172, 368. For example, various equipment may be located outside of cavities 176, 172, 368 but within a nacelle enveloping drive train 156. Access hatch 376 could provide a person access to this equipment. Also, as mentioned above, generator 108 may be provided with rear closure 344 having removable protective panels on its downwind side. By exiting cavity 176 of turret 140 through access hatch 376, a person could proceed to remove one or more of the access panels and access one or more components inside generator 108, such as braking devices 280 or active rotor or stator portions 260, 328, among others. Having cavities 368, 176, 172 of tower 136, turret 140 and spindle 160 traversable by at least an average-size adult human greatly contributes to the safety of personnel that must inspect, maintain or otherwise access various parts of wind turbine 100.

Regarding the sizes of cavities 176, 172, 380 to allow traversing by personnel, the minimum cross-sectional dimensions of these cavities perpendicular to the direction of traverse should be 25 inches (cm) in diameter if the cross-section is circular in shape and about 31 inches (cm) high by about 22 inches (cm) wide if the cross-section is rectangular in shape. Cavity 368 of tower 136 can typically be somewhat smaller due to the orientation of the personnel's body therein. Of course, these dimensions may be, and are preferably, larger than these dimensions. The dimension(s) of any constrictions within any one or more of cavities 176, 172, 380, 368 should not be much less than the corresponding minimums.

Although it is preferred that cavities 172, 176, 368 be largely unobstructed so as to permit personnel access, these cavities may house a variety of devices (not shown), which may be mounted either permanently or removably, depending upon the extent that the devices interfere with movement of a person therein. For example, slip rings and speed measurement devices may be provided in cavity 172 of spindle 160 and made removable so as to allow these devices to be moved out of the way for access to cavity 380 of wind rotor hub 124. Of course, those skilled in the art will readily understand the variety of devices that may be located either permanently or removably within cavities 172, 176, 368, 380.

As shown in FIG. 4, wind turbine 100 may optionally include one or more devices, such as device 382, mounted within one or more of cavities 172, 176, 368, 380. For example, device 382 may comprise a slip encoder for determining the rotational speed and/or rotational position of wind rotor 104 relative to spindle 160. Device 382 may include a first assembly 384 fixedly secured to spindle 160 and a second assembly 386 fixedly secured to wind rotor hub 124 so as to rotate therewith and relative to the first assembly. First assembly 384 may include a first functional component 388, e.g., an encoding unit, of device 382 and one or more supports 390 fixedly locating the first functional component relative to spindle 160. Similarly, second assembly 386 may include a second functional component 392, e.g., an encoder wheel assembly, of device 382 and one or more supports 394 fixedly locating the second functional component relative to wind rotor hub 124. In some embodiments, one or more of supports 390, 394 may be made easily removable so that personnel can easily move first and/or second assemblies 384, 384 as necessary to make cavity 380 of wind rotor hub 124 readily accessible from cavity 172 of spindle 160. In other embodiments, depending upon the configurations of supports 390, 394 and the transverse cross sectional areas of cavities 380, 172, these supports may be configured so that full access to cavity 380 from cavity 172 is possible only when wind rotor hub 124 is in a specific orientation relative to spindle 160 such that supports 390, 394 provide the least amount of blockage possible.

Although the invention has been described and illustrated with respect to an exemplary embodiment thereof, it should be understood by those skilled in the art that the foregoing and various other changes, omissions and additions may be made therein and thereto, without parting from the spirit and scope of the present invention.

What is claimed is:

1. A wind turbine/generator set, comprising:
   a generator that includes a stator assembly and a rotor assembly rotatable about a rotational axis, said rotor assembly including an active portion and an active portion support supporting said active portion;
   a wind rotor coupled to said rotor assembly;
   a generator support fixedly supporting said stator assembly and rotatably supporting said rotor assembly; and
   at least one braking device fixed relative to said generator support and including at least one frictional member operatively configured for frictionally engaging at least a portion of said active portion support.

2. A wind turbine/generator set according to claim 1, wherein said at least one second frictional member is a drum-brake shoe.

3. A wind turbine/generator set according to claim 1, wherein said active portion support includes a braking flange perpendicular to said rotational axis.

4. A wind turbine/generator set according to claim 3, wherein said at least one frictional member frictionally engages said braking flange.

5. A wind turbine/generator set according to claim 4, wherein said at least one braking device is a caliper-type braking device.

6. A wind turbine/generator set according to claim 1, wherein said generator support comprises a plurality of support arms and said at least one braking device is attached to at least one of said plurality of support arms.

7. A wind turbine/generator set according to claim 1, wherein said stator assembly includes an active portion located radially outward of said active portion of said rotor assembly relative to said rotational axis, said at least one braking device located radially inward of said active portion of said rotor assembly relative to said rotational axis.

8. A wind turbine/generator set according to claim 7, wherein said active portion support includes an integral braking flange and said at least one frictional member frictionally engages said integral braking flange.

9. A wind turbine/generator set according to claim 8, wherein said generator support comprises a plurality of stator support arms extending radially relative to said rotational axis and spaced circumferentially about said rotational axis, said at least one braking device being attached to at least one of said plurality of stator support arms.

10. A wind turbine/generator set according to claim 9, wherein said generator support further comprises a central spindle extending along said rotational axis, wherein said central spindle rotationally supports said wind rotor and said rotor assembly.

11. A wind turbine/generator set according to claim 10, wherein said plurality of stator support arms are fixedly secured to said central spindle.

12. A wind turbine/generator set according to claim 11, wherein said central spindle includes a central longitudinal opening extending along, and concentric with, said rotational axis.

13. A wind turbine/generator set according to claim 1, wherein said generator support comprises a central spindle extending along said rotational axis, wherein said central spindle rotationally supports said wind rotor and said rotor assembly.

14. A wind turbine/generator set according to claim 13, wherein said central spindle includes a central longitudinal opening extending along, and concentric with, said rotational axis.

15. A wind turbine/generator set according to claim 14, wherein said generator support further comprises a plurality of stator support arms fixedly secured to said central spindle and extending radially relative to said rotational axis and spaced circumferentially about said rotational axis, said at least one braking device being attached to at least one of said plurality of stator support arms.

16. A wind turbine/generator set according to claim 15, wherein said stator assembly includes an active portion located radially outward of said active portion of said rotor assembly relative to said rotational axis and supported by said plurality of stator support arms, said at least one braking device supported by at least one of said plurality of stator support arms so as to be located radially inward of said active portion of said rotor assembly relative to said rotational axis.

17. A wind turbine/generator set according to claim 16, wherein said active portion support includes an integral braking flange and said at least one frictional member frictionally engages said integral braking flange.

* * * * *